United States Patent [19]

Laufer

[11] Patent Number: 5,292,540

[45] Date of Patent: Mar. 8, 1994

[54] PROCESS FOR PREPARING LOW FAT POTATO CHIPS

[76] Inventor: Stephen Laufer, 1452 Cerro Gordo St., Los Angeles, Calif. 90026

[21] Appl. No.: 30,794

[22] Filed: Mar. 12, 1993

Related U.S. Application Data

[63] Continuation-in-part of Ser. No. 712,943, Jun. 10, 1991, Pat. No. 5,194,277.

[51] Int. Cl.$^5$ .............................................. A23L 1/217
[52] U.S. Cl. .................................. 426/242; 426/243; 426/637
[58] Field of Search ............... 426/241, 242, 243, 510, 426/511, 523, 637

[56] References Cited

U.S. PATENT DOCUMENTS

| | | | |
|---|---|---|---|
| 3,881,028 | 4/1975 | Capossela et al. | 426/243 X |
| 4,073,952 | 2/1978 | Standing et al. | 426/242 |
| 4,283,425 | 8/1981 | Yuan et al. | 426/242 X |
| 4,906,483 | 3/1990 | Kloos | 426/243 |
| 4,919,965 | 4/1990 | Childers | 426/523 X |
| 5,049,711 | 9/1991 | August | 426/241 X |
| 5,180,601 | 1/1993 | Gaon et al. | 426/243 X |
| 5,202,139 | 4/1993 | Gaon et al. | 426/243 X |

FOREIGN PATENT DOCUMENTS 3443218  5/1986  Fed. Rep. of Germany ...... 426/242

*Primary Examiner*—Arthur L. Corbin
*Attorney, Agent, or Firm*—Lyon & Lyon

[57] ABSTRACT

A process for preparing potato chips and shoestring potatoes in which no additional fat content is added to the potato and none of the natural foodstuffs are removed. The process comprises the steps of slicing a potato to produce a plurality of potato slices or strips of the desired configuration and microwave heating the slices or strips for a period of about six to nine minutes to produce a product having substantially the same flavor, color, crispness and slightly greasy appearance as deep-fried potato chips or shoestring potatoes. The potato slices or strips can be steamed or baked prior to microwave heating to reduce the microwave heating time and can be subjected to a second microwave heating step to reduce the moisture content therein for a longer shelf life.

16 Claims, No Drawings

PROCESS FOR PREPARING LOW FAT POTATO CHIPS

This application is a continuation-in-part of Ser. No. 712,943, filed Jun. 10, 1991, now U.S. Pat. No. 5,194,277, issued Mar. 16, 1993.

BACKGROUND OF THE INVENTION

The present invention relates to a process for producing potato chips and shoestring potatoes, which have substantially the same flavor, color and crispness as well as a slightly greasy appearance similar to conventional deep-fried products but in which no fat content is added to the potato and no foodstuff is removed. Potato chips and shoestring potatoes are typically produced by deep frying thin slices or strips of raw potatoes in an oil. The deep frying process reduces the water content in the potatoes while adding oil to the product to produce the desired color and crispness. However, the resulting product contains considerable oil, and thus fat, which is generally unhealthy.

With increased public awareness of the benefits of low fat foods, efforts have been undertaken to develop alternate methods for producing the ever popular potato chip. Examples of such efforts are seen in U.S. Pat. Nos. 4,277,510, 4,283,425, 4,749,579 and 4,906,483. While reducing the fat content of the resulting chip in comparison to the conventional deep frying process, the processes described in U.S. Pat. Nos. 4,277,510 and 4,749,579 continue to employ the step of frying the slices of potato in an oil and thus continue to add fat to the chip. The process described in U.S. Pat. No. 4,906,483 like the present invention, employs microwave heating in lieu of deep frying, but additionally teaches the removal of the starch from the potato chip and thus does not provide the whole food content of the potato. The process described in U.S. Pat. No. 4,283,425 also employs microwave cooking in lieu of frying to avoid the addition of fat to the chip but teaches the necessity of coating the chip prior to the microwave heating thereof with a globular protein such as soy isolate or egg albumen. As certain individuals are allergic to soy and dairy products and others prefer natural foods with no additives, such a process would be somewhat limited in its appeal. In contrast to the above processes, the process of the present invention not only provides potato chips having substantially the same flavor, color, crispness and a slightly greasy appearance similar to conventional deep-fried potato chips, without the need for deep-frying, but does so without the addition or deletion of any food content to the natural potato. The result is a completely natural potato chip which is very low in fat.

SUMMARY OF THE INVENTION

Briefly, the present invention is directed to a process for preparing potato chips having substantially the same flavor, color, crispness and a slightly greasy appearance similar to deep-fried potato chips but in which no fat content is added to the natural potato and none of the natural foodstuffs therein are removed. The process comprises the steps of washing the potatoes to remove foreign matter from the skin thereof, cutting the potato into thin slices and heating the slices of potato in a microwave oven for about three to ten minutes depending on the power of the microwave equipment and the quantity of slices being subjected to the microwaves. Depending on the food contact surface used in the microwave oven, the slices of potato can be rotated 180° at the mid-point of the microwave heating step to prevent the potato slices from adhering to the contact surface. After heating, the chips are removed from the microwave oven and are ready for consumption. If desired, salt can be added prior to or after the microwave heating. Other natural seasonings can also be added to the chips but preferably after microwave heating to avoid burning the seasonings. To reduce the cooking time in the microwave oven, the potato slices can be steamed or baked prior to microwaving. To facilitate handling of steamed slices, the wet slices can be dried with convection heat prior to microwaving. If a reduced moisture content is desired in the chip to increase the shelf-life of the product, the cooked chips can be subjected to a microwave drying step wherein the chips are again exposed to microwave energy, but at a lower intensity. In addition to producing low fat potato chips, the process of the present invention can also be used to produce shoestring potatoes without the addition of any fat and without removing any of the natural foodstuffs of the potato.

It is the principal object of the present invention to provide an improved process for preparing potato chips which does not add any additional fat content to the natural potato to provide a low fat potato chip nor removes any of the natural foodstuffs from the potato.

It is another object of the present invention to provide an improved process for preparing potato chips which obviates the need to add any other food item or chemical to the potato during the process.

It is yet another object of the present invention to provide an improved process for preparing potato chips which eliminates the need to fry the chips in oil during the process.

It is yet another object of the present invention to provide an improved process for preparing shoestring potatoes which does not add any additional fat content to the natural potato to provide a low fat shoestring potato and which does not remove any of the natural foodstuffs from the potato.

These and other objects and advantages of the present invention will become readily apparent from the following detailed description.

DESCRIPTION OF THE PREFERRED EMBODIMENT

In the process of the present invention, the potatoes are first washed to remove any foreign matter from the exterior skin thereof. The washed potatoes are then sliced, preferably without removing the skins, to a thickness of about 1/16 of an inch. The potato slices are then laid on a ceramic or other suitable plate, placed in a microwave oven and heated in the microwave oven from about three to ten minutes, depending on the wattage of the microwave oven and the quantity of the slices being cooked. In a typical microwave oven designed for home use and having a power rating of about seven hundred to one thousand watts and operating at about 2450 MHz, a batch of about two dozen of the cut slices are heated for about six to ten minutes at a full power setting, with about eight minutes being the optimum heating time. In a commercial microwave unit having a power rating within the range of about fifty to three hundred kilowatts and operating at about 915 MHz, the heating time could be reduced to about two to eight minutes, depending on the power of the microwave oven and number of chips being cooked.

To prevent the potato slices from adhering to the plate, the slices are preferably turned 180° at the midpoint of the heating. If a non-stick plate surface is employed, turning of the potato slices is not necessary. Alternatively, a support tray could be employed for stacking the slices on and in a vertical disposition within the microwave oven to prevent the potato slices from sticking to the plate without the need for interrupting the heating process to turn the slices. For commercial operations, a continuous heating cycle could be employed in which the potato slices are placed on a conveyor which runs thorough a microwave heating station for mass producing the potato chips of the present invention. At the completion of the heating period in the microwave oven, the chips are removed and are ready for consumption. If desired, salt or other natural seasonings can be added to the potato slices. Salt can be added prior to or after heating the chips in the microwave oven, whereas other seasonings which are susceptible to burning should be added after the microwave heating step. If seasonings are added to the potato slices after the microwave heating, it may be necessary to add a very small amount of oil or other suitable medium to the cooked chips or to the seasoning so that the seasoning will adhere to the cooked potato product.

In certain instances, it may be desirable to reduce the time of the microwave heating process for energy or other considerations. By steaming or baking the slices of potatoes prior to microwaving, the time necessary for microwaving the potato slices can be reduced. It has been found that by steaming the potato slices for about two to five minutes, the microwave heating time can be reduced to about four to eight minutes. Baking the slices at a temperature within the range of about 250 to 500 degrees Fahrenheit also reduces the microwave heating time. For example, baking the chips at about 400° F. for a period of six to twelve minutes will reduce the microwave cooking time in a home microwave oven to about three to seven minutes, with the optimum baking time for about twenty chips being about ten minutes and the microwave cooking time being about five minutes. In mass production commercial applications employing pre-baking, it would be highly desirable to provide a circulatory fan to circulate the air during the pre-microwave baking step to promote partial drying of the chips due to the increased moisture emanating from the substantially larger quantity of chips involved. The use of circulating air within the baking station would further facilitate the drying of the chips. By pre-baking the chips prior to microwaving about 50% up to 80% of the moisture is removed from the chip. In commercial applications this pre-baking step would reduce the microwaving time to about one to five minutes, depending on the time and temperature of the prebaking step (preferably about ten minutes at 400° F.), the quantity of the chips being baked and the process of the microwave unit. The overall chips processing time in commercial applications employing a baking step could be reduced by overlapping the baking and microwaving steps. In such instances, the microwave energy may be applied intermittently due to the heat of the baking to reduce total energy consumption. In a suitable oven, the microwaving of the chips could begin prior to the completion of the baking step. In those instances in which steaming is employed, it may also be desirable to dry the potato slices prior to microwave heating by a brief period of convection heating to facilitate handling of the potato slices.

To increase the shelf life of the chips cooked by the above-described microwaving or baking and microwaving steps, the cooked chips could be further dried by a second microwaving step. This could be accomplished with a typical home microwaving oven with a maximum power rating of one kilowatt by subjecting the cooked chips to the microwaves at a medium power setting for a period of about one and one half to six minutes, with about three minutes being preferred. In a commercial application, the power in the microwave unit would be reduced by about 50% from that employed in the microwave cooking step and the chips would also be exposed to the microwaves for about one and one half to six and preferably about four minutes.

In addition to potato chips, the aforesaid process can be used to produce shoestring style potatoes. To produce shoestring potatoes, the same process is employed except that the potatoes, after washing are sliced into elongated or curved strips of the desired configuration and length, preferably about 1/16-⅛ in. in thickness, and then heated in a home microwave oven for about six to twelve minutes depending on thickness of the strips or for about two to ten minutes in a commercial microwave oven. As with the potato slices, the potato strips can also be steamed or baked prior to microwaving to reduce the microwave heating time, and, if desired, subjected to a second microwaving step to provide increased shelf life. As shoestring potatoes are generally somewhat thicker than potato chips, their steaming and baking times will be slightly greater than the corresponding times for pre-cooking the slices used in the production of potato chips. For example, by baking the strips at about 400° Fahrenheit for about six to fourteen minutes, the microwave heating time is reduced to about three to ten minutes in home units and to about two to ten minutes in commercial microwave unit. As with the chips, the microwaved strips could be further dried by a second microwaving step to increase the shelf life of the product. This could be accomplished by using the same above-described parameters employed with the potato chips. Other low fat chips comprised of other tubers and vegetables such as sweet potatoes, yams and beets as well as chips comprised of mixed ingredients, such as tortilla chips, could also be prepared utilizing the aforesaid processes. With chips employing mixed ingredients such as tortilla chips, the chips would be press formed in a conventional manner, as opposed to sliced, and then microwave cooked, baked and microwave cooked or baked, microwave cooked, and microwave dried as previously described. In the preparation of tortilla chips, however, the baking time is preferably reduced to a range of about forty-five seconds to seven minutes while the baking temperature range is increased to about 300–600 degrees Fahrenheit. In addition, if a microwave drying step were employed after the microwave cooking step to increase the shelf life of the chips, the cooked tortilla chips would be exposed to the microwaves at the above-described reduced power settings for a period of about forty-five seconds to five minutes.

Various changes and modifications may be made in carrying out the present invention without departing from the spirit and scope thereof. Insofar as these changes and modifications are within the purview of the appended claims, they are to be considered as part of the present invention.

I claim:

1. A method for preparing a potato product having a low fat content in which none of the natural foodstuffs of the potato are removed, said method consisting of the following steps: cutting a potato to produce a plurality of potato slices; baking the slices for a period of about six to twelve minutes within a temperature range of about 250 to 500 degrees Fahrenheit; and microwave heating the slices for a period of about two to seven minutes to produce a product having substantially the same flavor, color, crispness and slightly greasy appearance as deep-fried potato chips and having no added fat content.

2. The method of claim 1 including the step of adding natural seasonings to the potato slices after the microwave heating step.

3. The method of claim 1 including the step of adding salt to the potato slices prior to the microwave heating step.

4. The method of claim 1 including the additional step of microwave heating the slices for a period of about one and one half to six minutes after the first microwave heating step, said additional microwave step being conducted at a lower power rating than the first microwave heating step.

5. A method for preparing a potato produce having a low fat content in which none of the natural foodstuffs of the potato are removed, said method consisting of the following steps: cutting a potato to produce a plurality of potato slices; baking the slices at a temperature within the range of about 250 to 500 degrees Fahrenheit for a period of up to about twelve minutes; and microwave heating the baked slices for a period of about one to seven minutes to produce a product having substantially the same flavor, color, crispness and slightly greasy appearance as deep-fried potato chips and having no added fat content.

6. The method of claim 5 wherein said baking step is conducted at about 400 degrees Fahrenheit for a period of six to twelve minutes.

7. The method of claim 5 including the additional step of microwave heating the slices for a period of about one and one half to six minutes after the first microwave heating step, said additional microwave heating step being conducted at a lower power rating than the first microwave heating step.

8. The method of claim 5 wherein at least a portion of said baking step occurs during said microwave heating step.

9. The method of claim 8 wherein at least a portion of said microwave heating step is conducted intermittently.

10. A method for preparing a potato product having a low fat content in which none of the natural foodstuffs of the potato are removed, said method consisting of the following steps: cutting a potato to produce a plurality of potato strips; baking the strips at a temperature within the range of about 250 to 500 degrees Fahrenheit for a period of up to about fourteen minutes; and microwave heating the strips for a period of two to ten minutes to produce a product having substantially the same flavor, color, crispness and slightly greasy appearance as deep-fried shoestring potatoes and having no added fat content.

11. A method for preparing a tuber chip product having a low fat content in which none of the natural foodstuffs of the tuber are removed, said method consisting of the following steps: cutting a tuber to produce a plurality of tuber slices; baking the slices for a period of about six to twelve minutes within a temperature range of about 250 to 500 degrees Fahrenheit; and microwave heating the slices for a period of about two to seven minutes to produce a product having substantially the same flavor, color, crispness and slightly greasy appearance as deep-fried tuber chips and having no added fat content.

12. The method of claim 11 including the additional step of microwave heating the slices for a period of about one and one half to six minutes after the first microwave heating step, said additional microwave heating step being conducted at a lower power rating than the first microwave heating step.

13. The method of claim 11 including the step of adding natural seasoning to the tuber slices after the microwave heating step.

14. The method of claim 11 including the step of adding salt to the tuber slices prior to the microwave heating step.

15. A method for preparing a potato produce having a low fat content in which none of the natural foodstuffs of the potato are removed, said method consisting of the following steps: cutting a potato to produce a plurality of potato slices; baking the slices at a temperature and for a time sufficient to remove about 50% to 80% of the moisture from the slices and microwave heating the baked slices for a period of about one to five minutes to produce a product having substantially the same flavor, color, crispness and slightly greasy appearance as deep-fried potato chips and having no added fat content.

16. The method of claim 15 including the additional step of microwave heating the slices for a period of about one and one half to six minutes after the first microwave heating step, said additional microwave heating step being conducted at a lower power rating than the first microwave heating step.

* * * * *